US009620819B2

United States Patent
(12) United States Patent
Lim et al.

(10) Patent No.: US 9,620,819 B2
(45) Date of Patent: Apr. 11, 2017

(54) NON-AQUEOUS ELECTROLYTE SOLUTION AND LITHIUM SECONDARY BATTERY COMPRISING THE SAME

(71) Applicant: LG Chem, Ltd., Seoul (KR)

(72) Inventors: Young Min Lim, Daejeon (KR); Chul Haeng Lee, Daejeon (KR); Kyoung Ho Ahn, Daejeon (KR); Doo Kyung Yang, Daejeon (KR)

(73) Assignee: LG Chem, Ltd. (KR)

(*) Notice: Subject to any disclaimer, the term of this patent is extended or adjusted under 35 U.S.C. 154(b) by 254 days.

(21) Appl. No.: 14/197,423

(22) Filed: Mar. 5, 2014

(65) Prior Publication Data

US 2014/0186722 A1 Jul. 3, 2014

Related U.S. Application Data

(63) Continuation of application No. PCT/KR2013/012101, filed on Dec. 24, 2013.

(30) Foreign Application Priority Data

Dec. 24, 2012 (KR) ........................ 10-2012-0152043
Dec. 23, 2013 (KR) ........................ 10-2013-0161528

(51) Int. Cl.

*H01M 10/0568* (2010.01)
*H01M 6/16* (2006.01)
*H01M 4/133* (2010.01)
*H01M 10/052* (2010.01)
*H01M 10/0569* (2010.01)
*H01M 4/587* (2010.01)
*H01M 10/0567* (2010.01)

(52) U.S. Cl.

CPC ....... *H01M 10/0568* (2013.01); *H01M 4/133* (2013.01); *H01M 4/587* (2013.01); *H01M 6/164* (2013.01); *H01M 6/166* (2013.01); *H01M 6/168* (2013.01); *H01M 10/052* (2013.01); *H01M 10/0567* (2013.01); *H01M 10/0569* (2013.01); *Y02E 60/122* (2013.01)

(58) Field of Classification Search

CPC ......... H01M 10/0568; H01M 10/0569; H01M 10/0567; H01M 10/052; H01M 6/166; H01M 6/164; H01M 6/168; H01M 4/587; H01M 4/133; Y02E 60/122

See application file for complete search history.

(56) References Cited

U.S. PATENT DOCUMENTS

| | | | |
|---|---|---|---|
| 6,682,855 | B2 | 1/2004 | Michot et al. |
| 2001/0025943 | A1 | 10/2001 | Michot et al. |
| 2004/0106047 | A1 | 6/2004 | Mie et al. |
| 2011/0183218 | A1 | 7/2011 | Odani et al. |
| 2012/0202123 | A1 | 8/2012 | Jeon et al. |
| 2012/0316716 | A1 | 12/2012 | Odani et al. |
| 2013/0157116 | A1 | 6/2013 | Hong et al. |

FOREIGN PATENT DOCUMENTS

| | | | |
|---|---|---|---|
| CN | 102074734 | A | 5/2011 |
| CN | 102136604 | A | 7/2011 |
| CN | 102820483 | A | 12/2012 |
| EP | 2770572 | A1 | 8/2014 |
| JP | H08511274 | A | 11/1996 |
| JP | 2004-165151 | A | 6/2004 |
| JP | 2009-187698 | A | 8/2009 |
| JP | 2011150958 | A | 8/2011 |
| JP | 2013016456 | A | 1/2013 |
| KR | 2010-0053457 | A | 5/2010 |
| KR | 2012-0016019 | A | 2/2012 |
| KR | 2012-0079390 | A | 7/2012 |
| WO | 2013058235 | A1 | 4/2013 |

OTHER PUBLICATIONS

Extended Search Report from European Applicatoin No. 13834349, dated Sep. 22, 2015.

Han, H. B. et al, "Lithium bis(fluorosulfonyl)imide (LiFSI) as conducting salt for nonaqueous liquid electrolytes for lithium-ion batteries: Physiochemical and electrochemical properties," Journal of Power Sources, Apr. 1, 2011, vol. 196, Issue 7, pp. 3623-3632.

International Search Report from PCT/KR2013/012101, dated Apr. 18, 2014.

*Primary Examiner* — Laura Weiner

(74) *Attorney, Agent, or Firm* — Lerner, David, Littenberg, Krumholz & Mentlik, LLP

(57) ABSTRACT

Provided are a non-aqueous electrolyte solution including propylene carbonate (PC) and lithium bis(fluorosulfonyl) imide (LiFSI), and a lithium secondary battery including the non-aqueous electrolyte solution. The lithium secondary battery including the non-aqueous electrolyte solution of the present invention may improve low-temperature output characteristics, high-temperature cycle characteristics, output characteristics after high-temperature storage, capacity characteristics, and swelling characteristics.

9 Claims, 4 Drawing Sheets

NON-AQUEOUS ELECTROLYTE SOLUTION AND LITHIUM SECONDARY BATTERY COMPRISING THE SAME

CROSS-REFERENCE TO RELATED APPLICATIONS

The present application is a continuation of International Application No. PCT/KR2013/012101 filed on Dec. 24, 2013, which claims the benefit of Korean Patent Application No. 10-2012-0152043, filed on Dec. 24, 2012 and Korean Patent Application No. 10-2013-0161528, filed on Dec. 23, 2013, the disclosures of which are incorporated herein by reference.

TECHNICAL FIELD

The present invention relates to a non-aqueous electrolyte solution comprising propylene carbonate (PC) and lithium bis(fluorosulfonyl)imide (LiFSI), and a lithium secondary battery comprising the non-aqueous electrolyte solution.

BACKGROUND ART

Demand for secondary batteries as an energy source has been significantly increased as technology development and demand with respect to mobile devices have increased. Among these secondary batteries, lithium secondary batteries having high energy density and high voltage have been commercialized and widely used.

A lithium metal oxide is used as a cathode active material of a lithium secondary battery, and lithium metal, a lithium alloy, crystalline or amorphous carbon, or a carbon composite is used as an anode active material. A current collector may be coated with the active material of appropriate thickness and length or the active material itself may be coated in the form of a film, and the resultant product is then wound or stacked with an insulating separator to prepare an electrode group. Thereafter, the electrode group is put into a can or a container similar thereto, and a secondary battery is then prepared by injecting an electrolyte solution.

Charge and discharge of the lithium secondary battery is performed while a process of intercalating and deintercalating lithium ions from a lithium metal oxide cathode into and out of a graphite anode is repeated. In this case, since lithium is highly reactive, lithium reacts with the carbon electrode to form $Li_2CO_3$, LiO, or LiOH. Thus, a film may be formed on the surface of the anode. The film is denoted as "solid electrolyte interface (SEI)" wherein the SEI formed at an initial stage of charging may prevent a reaction of the lithium ions with the carbon anode or other materials during charge and discharge. Also, the SEI may only pass the lithium ions by acting as an ion tunnel. The ion tunnel may prevent the destruction of a structure of the carbon anode due to the co-intercalation of the carbon anode and organic solvents of an electrolyte solution having a high molecular weight which solvates lithium ions and moves therewith.

Therefore, in order to improve high-temperature cycle characteristics and low-temperature output of the lithium secondary battery, a robust SEI must be formed on the anode of the lithium secondary battery. When the SEI is once formed during the first charge, the SEI may prevent the reaction of the lithium ions with the anode or other materials during repeated charge and discharge cycles caused by the subsequent use of the battery, and may act as an ion tunnel that only passes the lithium ions between the electrolyte solution and the anode.

In general, binary and tertiary electrolytes based on ethylene carbonate (EC) may be used as an electrolyte of a lithium-ion battery. However, since the EC has a high melting point, an operating temperature may be limited and battery performance may be significantly reduced at a low temperature.

DISCLOSURE OF THE INVENTION

Technical Problem

The present invention provides a non-aqueous electrolyte solution for a lithium secondary battery which may improve high-temperature cycle characteristics, output characteristics after high-temperature storage, capacity characteristics, and swelling characteristics as well as low-temperature output characteristics, and a lithium secondary battery including the same.

Technical Solution

According to an aspect of the present invention, there is provided a non-aqueous electrolyte solution including: i) a non-aqueous organic solvent including propylene carbonate (PC); and ii) lithium bis(fluorosulfonyl)imide (LiFSI).

According to another aspect of the present invention, there is provided a lithium secondary battery including: a cathode including a cathode active material; an anode including an anode active material; a separator disposed between the cathode and the anode; and the non-aqueous electrolyte solution.

Advantageous Effects

With respect to a lithium secondary battery including a non-aqueous electrolyte solution according to the present invention, since a solid electrolyte interface (SEI) may be formed during the initial charge of the lithium secondary battery, the non-aqueous electrolyte solution may improve high-temperature cycle characteristics, output characteristics after high-temperature storage, capacity characteristics, and swelling characteristics as well as low-temperature output characteristics.

NODE FOR CARRYING OUT THE INVENTION

Figure 1:
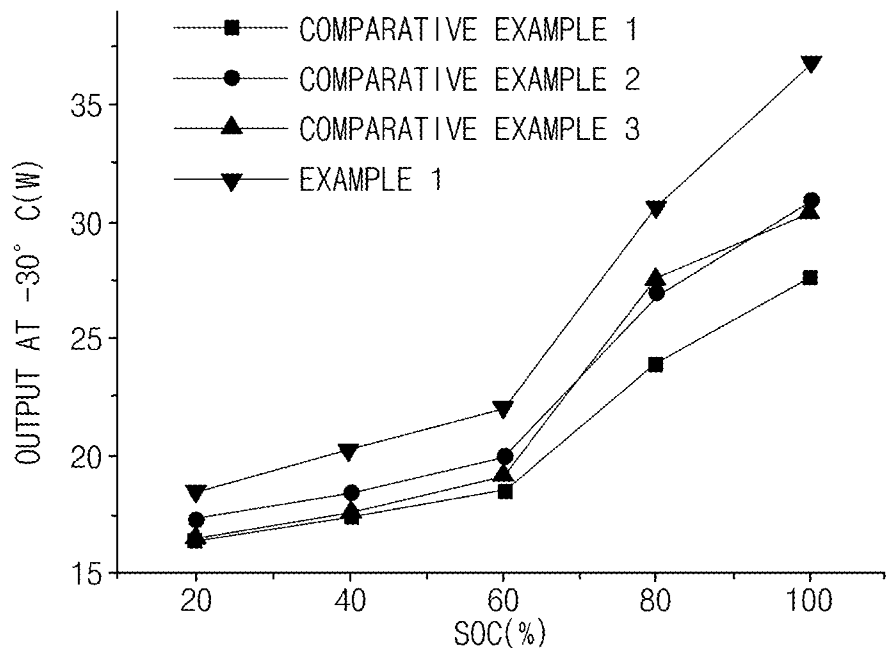
FIG. 1 is a graph illustrating the results of the measurement of low-temperature output characteristics of lithium secondary batteries of Example 1 and Comparative Examples 1 to 3 according to the state of charge (SOC), according to Experimental Example 1.

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A non-aqueous electrolyte solution according to an embodiment of the present invention may include a non-aqueous organic solvent including propylene carbonate (PC), and lithium bis(fluorosulfonyl)imide (LiFSI).

According to an embodiment of the present invention, in a case where lithium bis(fluorosulfonyl)imide is used in combination with the PC solvent, since a robust solid electrolyte interface (SEI) may be formed at an anode during initial charge, low-temperature output characteristics may not only be improved but the decomposition of the surface of a cathode, which may occur during high-temperature cycles above 55° C., and an oxidation reaction of the electrolyte solution may also be prevented. Thus, capacity of a battery may be improved by preventing a swelling phenomenon.

In general, binary and tertiary electrolytes based on ethylene carbonate (EC) may be used as an electrolyte of a lithium-ion battery. However, since the EC has a high melting point, an operating temperature may be limited and battery performance may be significantly reduced at a low temperature. In contrast, an electrolyte including propylene carbonate may act as an excellent electrolyte while having a wider temperature range than the ethylene carbonate electrolyte.

However, in a case where propylene carbonate is used with a lithium salt, such as $LiPF_6$, as a solvent, an enormous amount of irreversible reactions may occur during a process of forming the SEI in the lithium-ion battery using a carbon electrode and a process of intercalating lithium ions, which are solvated by the propylene carbonate, between carbon layers. This may cause the degradation of the battery performance such as high-temperature cycle characteristics.

Also, when the lithium ions solvated by the propylene carbonate are intercalated into the carbon layers constituting the anode, exfoliation of a carbon surface layer may proceed. The exfoliation may occur because gas, which is generated when the solvent decomposes between the carbon layers, causes large distortion between the carbon layers. The exfoliation of the carbon surface layer and the decomposition of the electrolyte solution may continuously proceed. As a result, since an effective SEI may not be formed when the electrolyte solution including propylene carbonate is used in combination with a carbon-based anode material, lithium ions may not be intercalated.

In the present invention, limitations in low-temperature characteristics due to the use of ethylene carbonate are addressed by using propylene carbonate having a low melting point, and the above-described limitations occurred when the propylene carbonate and the lithium salt, such as $LiPF_6$, are used together may be addressed by using lithium bis(fluorosulfonyl)imide in combination therewith.

According to an embodiment of the present invention, a concentration of the lithium bis(fluorosulfonyl)imide in the non-aqueous electrolyte solution may be in a range of 0.1 mole/l to 2 mole/l, for example, 0.6 mole/l to 1.5 mole/l. In the case that the concentration of the lithium bis(fluorosulfonyl)imide is less than the above range, effects of improving the low-temperature output and high-temperature cycle characteristics of the battery may be insignificant. In the case in which the concentration of the lithium bis(fluorosulfonyl)imide is greater than the above range, side reactions in the electrolyte solution may excessively occur during charge and discharge of the battery, and thus, the swelling phenomenon may occur.

In order to further prevent the side reactions, the non-aqueous electrolyte solution of the present invention may further include a lithium salt. Any lithium salt typically used in the art may be used as the lithium salt. For example, the lithium salt may include any one selected from the group consisting of $LiPF_6$, $LiBF_4$, $LiSbF_6$, $LiAsF_6$, $LiClO_4$, $LiN(C_2FsSO_2)_2$, $LiN(CF_3SO_2)_3$, $CF_3SO_3Li$, $LiC(CF_3SO_2)_3$, and $LiC_4BO_8$, or a mixture of two or more thereof.

According to an embodiment of the present invention, the low-temperature output characteristics, capacity characteristics after high-temperature storage, and cycle characteristics of the lithium secondary battery may be improved by adjusting a mixture ratio of the lithium salt to the lithium bis(fluorosulfonyl)imide.

Specifically, the mixture ratio of the lithium salt to the lithium bis(fluorosulfonyl)imide may be in a range of 1:6 to 1:9 as a molar ratio. In the case that the mixture ratio of the lithium salt to the lithium bis(fluorosulfonyl)imide is outside the range of the molar ratio, the side reactions may excessively occur in the electrolyte solution during the charge and discharge of the battery, and thus, the swelling phenomenon may occur. Specifically, in the case in which the mixture ratio of the lithium salt to the lithium bis(fluorosulfonyl)imide is less than 1:6 as a molar ratio, the enormous amount of irreversible reactions may occur during the process of forming the SEI in the lithium-ion battery and the process of intercalating lithium ions, which are solvated by the propylene carbonate, into the anode, and the effects of improving the low-temperature output, and the cycle characteristics and capacity characteristics after high-temperature storage of the secondary battery may be insignificant by the exfoliation of an anode surface layer (e.g., carbon surface layer) and the decomposition of the electrolyte solution.

An amount of the propylene carbonate included as the non-aqueous organic solvent according to an embodiment of the present invention is in a range of 5 parts by weight to 60 parts by weight, and preferably in a range of 10 parts by weight to 50 parts by weight based on 100 parts by weight of the non-aqueous organic solvent. In the case that the amount of the propylene carbonate is less than 5 parts by weight, since gas may be continuously generated due to the decomposition of the surface of the cathode during a high-temperature cycle, the swelling phenomenon may occur in which a thickness of the battery increases. In the case in which the amount of the propylene carbonate is greater than 60 parts by weight, a robust SEI may be difficult to be formed in the anode during the initial charge.

Also, a non-aqueous organic solvent, which may be included in the non-aqueous electrolyte solution in addition to the propylene carbonate, is not limited as long as it may minimize the decomposition due to the oxidation reaction during the charge and discharge of the battery and may exhibit desired characteristics with additives.

The non-aqueous organic solvent according to the embodiment of the present invention may not include ethylene carbonate (EC), and for example, may further include any one selected from the group consisting of ethyl propionate (EP), methyl propionate (MP), butylene carbonate (BC), dimethyl carbonate (DMC), diethyl carbonate (DEC), dipropyl carbonate (DPC), ethylmethyl carbonate (EMC), methylpropyl carbonate (MPC), ethylpropyl carbonate (EPC), and ester-based, ether-based, and ketone-based organic solvents, or a mixture of two or more thereof.

The non-aqueous electrolyte solution according to the embodiment of the present invention may further include a vinylene carbonate-based compound and a sultone-based compound.

The vinylene carbonate-based compound may play a role in forming the SEI. The kind of the vinylene carbonate-based compound is not limited as long as it may play the above role, and for example, the vinylene carbonate-based compound may include vinylene carbonate (VC), vinylene ethylene carbonate (VEC), or a mixture thereof. Among these materials, the vinylene carbonate-based compound may particularly include vinylene carbonate.

Also, the sultone-based compound, which may be further included according to the embodiment of the present invention, may play a role in improving the low-temperature output and high-temperature cycle characteristics of the battery. The kind of the sultone-based compound is not limited as long as it may play the above role, and for example, the sultone-based compound may include any one selected from the group consisting of 1,3-propane sultone (PS), 1,4-butane sultone, and 1,3-propene sultone, or a mixture of two or more thereof. Among these materials, the sultone-based compound may particularly include 1,3-propane sultone.

A lithium secondary battery according to an embodiment of the present invention may include a cathode including a cathode active material; an anode including an anode active material; a separator disposed between the cathode and the anode; and the non-aqueous electrolyte solution.

Herein, the cathode active material may include a manganese-based spinel active material, lithium metal oxide, or a mixture thereof. Furthermore, the lithium metal oxide may be selected from the group consisting of lithium-manganese-based oxide, lithium-nickel-manganese-based oxide, lithium-manganese-cobalt-based oxide, and lithium-nickel-manganese-cobalt-based oxide, and for example, may include $LiCoO_2$, $LiNiO_2$, $LiMnO_2$, $LiMn_2O_4$, $Li(Ni_aCo_bMn_c)O_2$ (where $0<a<1$, $0<b\leq1$, $0<c<1$, and $a+b+c=1$), $LiNi_{1-Y}Co_YO_2$, $LiCo_{1-Y}Mn_YO_2$, $LiNi_{1-Y}Mn_YO_2$ (where $0\leq Y<1$), $Li(Ni_aCo_bMn_c)O_4$ (where $0<a<2$, $0<b<2$, $0<c<2$, and $a+b+c=2$), $LiMn_{2-z}Ni_zO_4$, and $LiMn_{2-z}Co_zO_4$ (where $0<z<2$).

As the anode active material, a carbon-based anode active material, such as crystalline carbon, amorphous carbon, or a carbon composite, may be used alone or in combination of two or more thereof. For example, the anode active material may include graphitic carbon such as natural graphite and artificial graphite.

Also, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination of two or more thereof as the separator. In addition, a typical porous nonwoven fabric, for example, a nonwoven fabric formed of high melting point glass fibers or polyethylene terephthalate fibers may be used. However, the separator is not limited thereto.

EXAMPLES

Hereinafter, the present invention will be described in more detail, according to examples and experimental examples. However, the present invention is not limited thereto.

Example 1

Preparation of Non-aqueous Electrolyte Solution

A non-aqueous electrolyte solution was prepared by adding 0.1 mole/l of $LiPF_6$, 0.9 mole/l of lithium bis(fluorosulfonyl)imide (LiFSI), 3 wt % of vinylene carbonate (VC), and 0.5 wt % of 1,3-propane sultone (PS) based on a total weight of the non-aqueous electrolyte solution to a non-aqueous organic solvent having a composition in which a volume ratio of propylene carbonate (PC):ethylmethyl carbonate (EMC):dimethyl carbonate (DMC) was 2:4:4.

Preparation of Lithium Secondary Battery

A cathode mixture slurry was prepared by adding 96 wt % of a mixture of $LiMn_2O_4$ and $Li(Ni_{0.33}Cu_{0.33}Mn_{0.33})O_2$ as a cathode active material, 3 wt % of carbon black as a conductive agent, and 3 wt % of polyvinylidene fluoride (PVdF) as a binder to N-methyl-2-pyrrolidone (NMP) as a solvent. An about 20 μm thick aluminum (Al) thin film as a cathode current collector was coated with the cathode mixture slurry and dried, and the Al thin film was then roll-pressed to prepare a cathode.

Also, an anode mixture slurry was prepared by adding 96 wt % of carbon powder as an anode active material, 3 wt % of PVdF as a binder, and 1 wt % of carbon black as a conductive agent to NMP as a solvent. A 10 μm thick copper (Cu) thin film as an anode current collector was coated with the anode mixture slurry and dried, and the Cu thin film was then roll-pressed to prepare an anode.

A polymer type battery was prepared by a typical method using a polyethylene (PE) separator with the cathode and anode thus prepared, and a lithium secondary battery was then completed by injecting the prepared non-aqueous electrolyte solution.

Example 2

A non-aqueous electrolyte solution and a lithium secondary battery were prepared in the same manner as in Example 1 except that 0.1 mole/l of $LiPF_6$ and 0.6 mole/l of LiFSI were used based on a total weight of the non-aqueous electrolyte solution.

Comparative Example 1

A non-aqueous electrolyte solution and a lithium secondary battery were prepared in the same manner as in Example 1 except that a non-aqueous organic solvent having a composition, in which a volume ratio of EC:EMC:DMC was 3:3:4, was used and LiPFe was used alone as a lithium salt.

Comparative Example 2

A non-aqueous electrolyte solution and a lithium secondary battery were prepared in the same manner as in Example 1 except that a non-aqueous organic solvent having a composition, in which a volume ratio of EC:EMC:DMC was 3:3:4, was used.

Comparative Example 3

A non-aqueous electrolyte solution and a lithium secondary battery were prepared in the same manner as in Example 1 except that $LiPF_6$ was used alone as a lithium salt.

Comparative Example 4

A non-aqueous electrolyte solution and a lithium secondary battery were prepared in the same manner as in Example 1 except that 0.1 mole/l of $LiPF_6$ and 0.5 mole/l of LiFSI were used based on a total weight of the non-aqueous electrolyte solution.

Experimental Example 1

Low-Temperature Output Characteristics Test

Low-temperature outputs were calculated from voltage differences which were obtained by discharging the lithium secondary batteries of Example 1 and Comparative Examples 1 to 3 at 0.5 C for 10 seconds for the state of charge (SOC) at −30° C. The results thereof are presented in FIG. 1.

Referring to FIG. 1, the lithium secondary battery of Example 1 had better output characteristics than the lithium secondary batteries of Comparative Examples 1 to 3 from 20% SOC, and from 60% SOC, the output characteristics of the lithium secondary battery of Example 1 began to exhibit a more significant difference from those of the comparative examples. Also, in a case where the SOC was 100%, it may be understood that the lithium battery of Example 1 had low-temperature output characteristics that was improved about 1.2 to 1.4 times or more in comparison to those of the lithium secondary batteries of Comparative Examples 1 to 3.

It may be confirmed that the low-temperature characteristics may be significantly improved by using propylene carbonate as a non-aqueous organic solvent instead of using ethylene carbonate.

Experimental Example 2

High-Temperature (55° C.) Cycle Characteristics Test

The lithium secondary batteries of Example 1 and Comparative Examples 1 to 3 were charged at 1 C to 4.2 V/38 mA at 55° C. under a constant current/constant voltage (CC/CV) condition and then discharged at a constant current (CC) of 3 C to a voltage of 3.03 V to measure discharge capacities. The charge and discharge were repeated 1 to 900 cycles and the measured discharge capacities are presented in FIG. 2.

Figure 2:
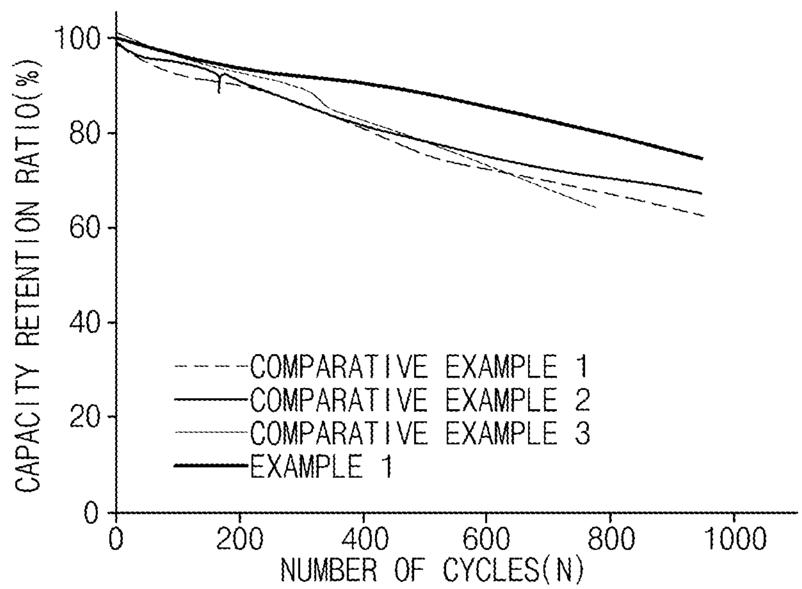
FIG. 2 is a graph illustrating the results of the measurement of capacity characteristics of lithium secondary batteries of Example 1 and Comparative Examples 1 to 3 according to the number of cycles, according to Experimental Example 2.

As illustrated in FIG. 2, the lithium secondary battery of Example 1 according to the present invention exhibited a capacity retention ratio similar to those of Comparative Examples 1 to 3 up to 200 cycles. However, a significant difference in the capacity retention ratio may be obtained after about 360 cycles.

Therefore, it may be understood that the lithium secondary battery (Example 1) using propylene carbonate in combination with lithium bis(fluorosulfonyl)imide according to the embodiment of the present invention had significantly better discharge capacity characteristics according to cycle characteristics at a high temperature of 55° C. than Comparative Examples 1 to 3.

Experimental Example 3

Output Characteristics After High-Temperature Storage

The lithium secondary batteries of Example 1 and Comparative Examples 1 to 3 were stored at 60° C. for 14 weeks, and outputs were then calculated from voltage differences which were obtained by discharging the lithium secondary batteries at 5 C for 10 seconds at 50% SOC. The results thereof are presented in FIG. 3.

Figure 3:
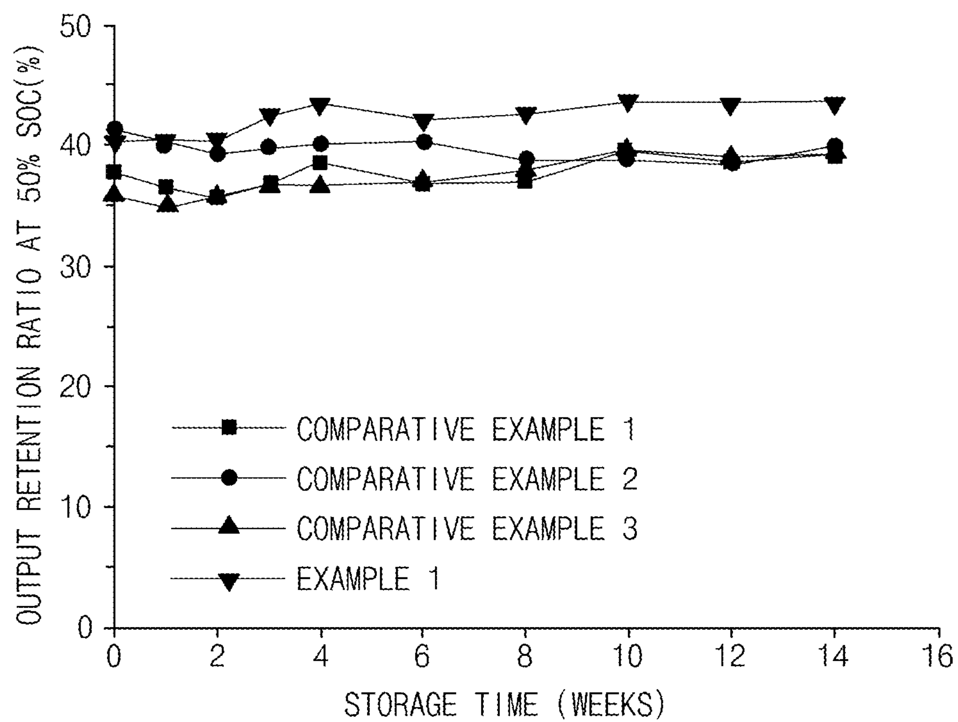
FIG. 3 is a graph illustrating the results of the measurement of output characteristics of lithium secondary batteries of Example 1 and Comparative Examples 1 to 3 at 50% SOC according to storage time after high-temperature storage, according to Experimental Example 3.

Referring to FIG. 3, with respect to the output characteristics at 50% SOC after storing at 60° C., it may be confirmed that the lithium secondary battery using propylene carbonate in combination with lithium bis(fluorosulfonyl)imide according to Example 1 of the present invention was significantly better than the lithium secondary batteries of Comparative Examples 1 to 3. Specifically, with respect to Example 1, it may be confirmed that the output characteristics were increased after the storage time of 2 weeks, and the output characteristics were continuously improved up to the storage time of 14 weeks even under a high-temperature condition as the storage time increased. In contrast, with respect to Comparative Examples 1 and 3, initial output characteristics were different from those of Example 1 and the output characteristics were significantly different from those of Example 1 at the storage time of 14 weeks. Also, with respect to Comparative Example 2, initial output characteristics were similar to those of Example 1. However, the output characteristics were gradually decreased after the storage time of 2 weeks and were significantly different from those of Example 1 at the storage time of 14 weeks as in the case of Comparative Examples 1 and 3.

Experimental Example 4

Capacity Characteristics Test After High-Temperature Storage

The lithium secondary batteries of Example 1 and Comparative Examples 1 to 3 were stored at 60° C. for 14 weeks and then charged at 1 C to 4.2 V/38 mA under a CC/CV condition. Then, the lithium secondary batteries were discharged at a CC of 1 C to a voltage of 3.0 V to measure discharge capacities. The results thereof are presented in FIG. 4.

Figure 4:
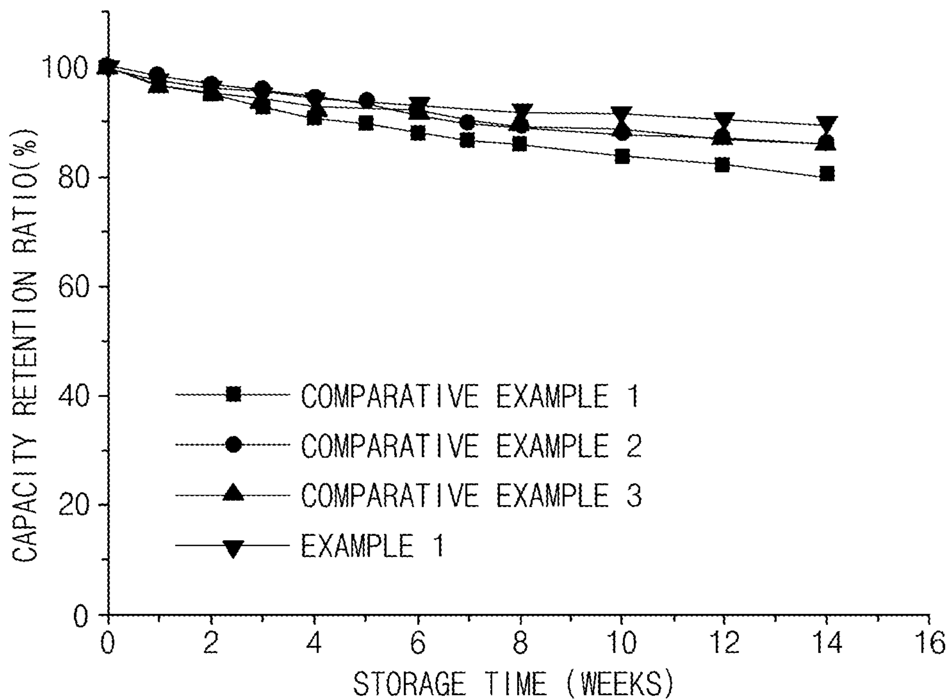
FIG. 4 is a graph illustrating the results of the measurement of capacity characteristics of lithium secondary batteries of Example 1 and Comparative Examples 1 to 3 according to storage time after high-temperature storage, according to Experimental Example 4.

Referring to FIG. 4, there was no difference between capacity characteristics of Example 1 and capacity characteristics of Comparative Examples 1 and 3 up to the storage time of 2 weeks. However, with respect to Comparative Examples 1 to 3 after the storage time of 4 weeks, the capacity characteristics were gradually decreased as the storage time increased. After the storage time of 8 weeks, it may be understood that the difference between the capacity characteristics of Example 1 and the capacity characteristics of Comparative Examples 1 to 3 was gradually increased.

Therefore, it may be confirmed that the capacity characteristics after high-temperature storage of the lithium secondary battery of Example 1 was improved in comparison to the lithium secondary batteries of Comparative Examples 1 to 3.

Experimental Example 5

Swelling Characteristics Test After High-Temperature Storage

The lithium secondary batteries of Example 1 and Comparative Examples 1 to 3 were stored at 60° C. for 14 weeks and thicknesses of the batteries were then measured after storing the batteries at 95% SOC. The results thereof are presented in FIG. 5.

Figure 5:
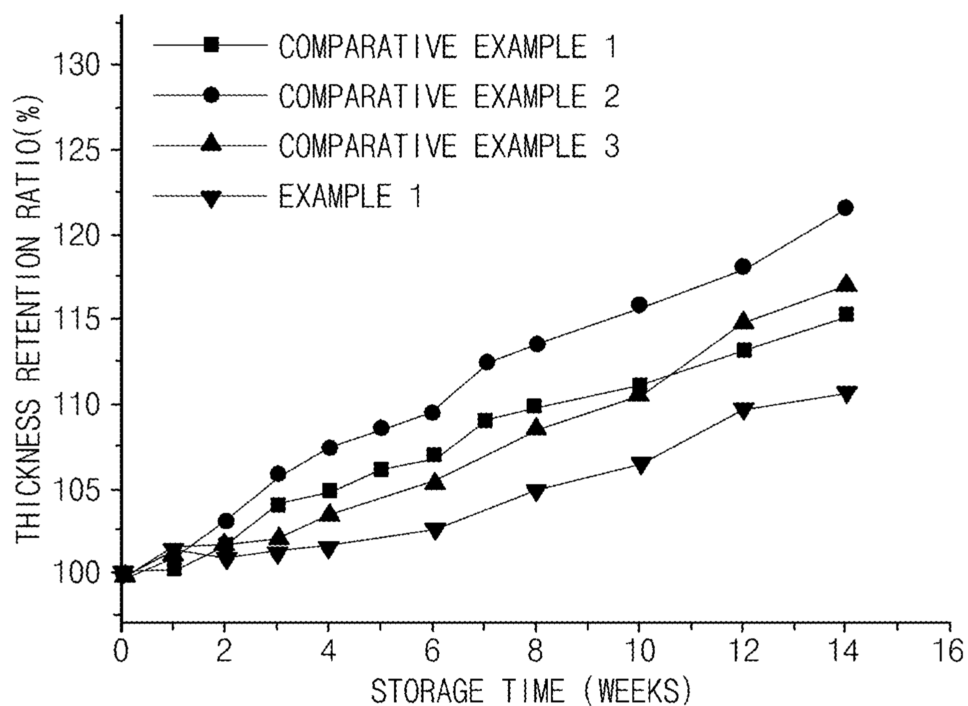
FIG. 5 is a graph illustrating the results of the measurement of swelling characteristics of lithium secondary batteries of Example 1 and Comparative Examples 1 to 3 according to storage time after high-temperature storage, according to Experimental Example 5.

Referring to FIG. 5, with respect to the lithium secondary batteries of Comparative Examples 1 to 3, the thicknesses of the batteries were significantly increased after the storage time of 2 weeks. In contrast, an increase in the thickness of the lithium secondary battery of Example 1 was low in comparison to those of the comparative examples.

Thus, it may be understood that since propylene carbonate was used in combination with lithium bis(fluorosulfonyl) imide, an effect of preventing the swelling of the battery may be improved even in the case in which the storage time after high-temperature storage was increased.

Experimental Example 6

Low-Temperature Output Characteristics Test According to Molar Ratio of $LiPF_6$ to LiFSI In order to investigate low-temperature output characteristics according to a molar ratio of $LiPF_6$ to LiFSI, low-temperature outputs were calculated from voltage differences which were obtained by discharging the lithium secondary batteries of Examples 1 and 2 and Comparative Example 4 at 0.5 C for 10 seconds for the SOC at −30° C. The results thereof are presented in FIG. 6.

Figure 6:
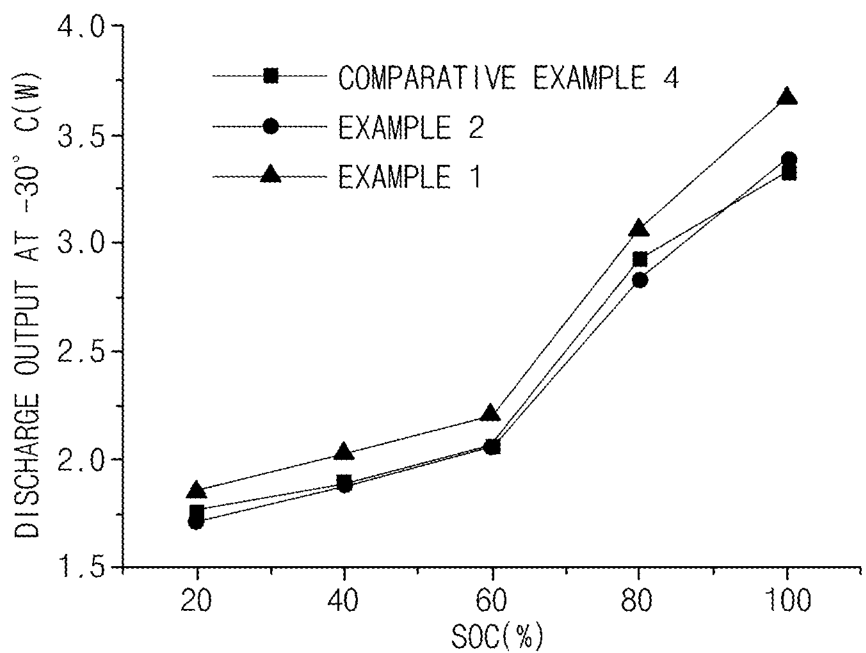
FIG. 6 is a graph illustrating the results of the measurement of low-temperature output characteristics of lithium secondary batteries of Examples 1 and 2 and Comparative Example 4 according to SOC, according to Experimental Example 6.

Referring to FIG. 6, the lithium secondary battery of Example 1 having a molar ratio of $LiPF_6$ to LiFSI of 1:9 had significantly better output characteristics from 20% SOC than the lithium secondary battery of Comparative Example 4 having a molar ratio of $LiPF_6$ to LiFSI of 1:5. From 60% SOC, the output characteristics of the lithium battery of Example 1 began to exhibit a more significant difference from those of the lithium battery of Comparative Example 4.

Also, low-temperature output characteristics of the lithium secondary battery of Example 2 having a molar ratio of $LiPF_6$ to LiFSI of 1:6 was decreased in comparison to the lithium secondary battery of Example 1 having a molar ratio of $LiPF_6$ to LiFSI of 1:9.

The lithium secondary battery of Example 2 having a molar ratio of $LiPF_6$ to LiFSI of 1:6 exhibited the output characteristics similar to those of the lithium secondary battery of Comparative Example 4 having a molar ratio of $LiPF_E$ to LiFSI of 1:5. However, it may be understood that the low-temperature output characteristics of the lithium secondary battery of Example 2 were improved in comparison to the lithium secondary battery of Comparative Example 4 from the SOC of 90% or more.

Therefore, it may be confirmed that the low-temperature output characteristics of the lithium secondary battery may be improved by adjusting the molar ratio of $LiPF_6$ to LiFSI.

Experimental Example 7

High-Temperature (55° C.) Cycle Characteristics Test According to Molar Ratio of $LiPF_6$ to LiFSI In order to investigate high-temperature (55° C.) cycle characteristics according to the molar ratio of $LiPF_6$ to LiFSI, the lithium secondary batteries of Examples 1 and 2 and Comparative Example 4 were charged at 1 C to 4.2 V/38 mA at 55° C. under a CC/CV condition and then discharged at a CC of 3 C to a voltage of 3.03 V to measure discharge capacities. The charge and discharge were repeated 1 to 1,000 cycles and the measured discharge capacities are presented in FIG. 7.

Figure 7:
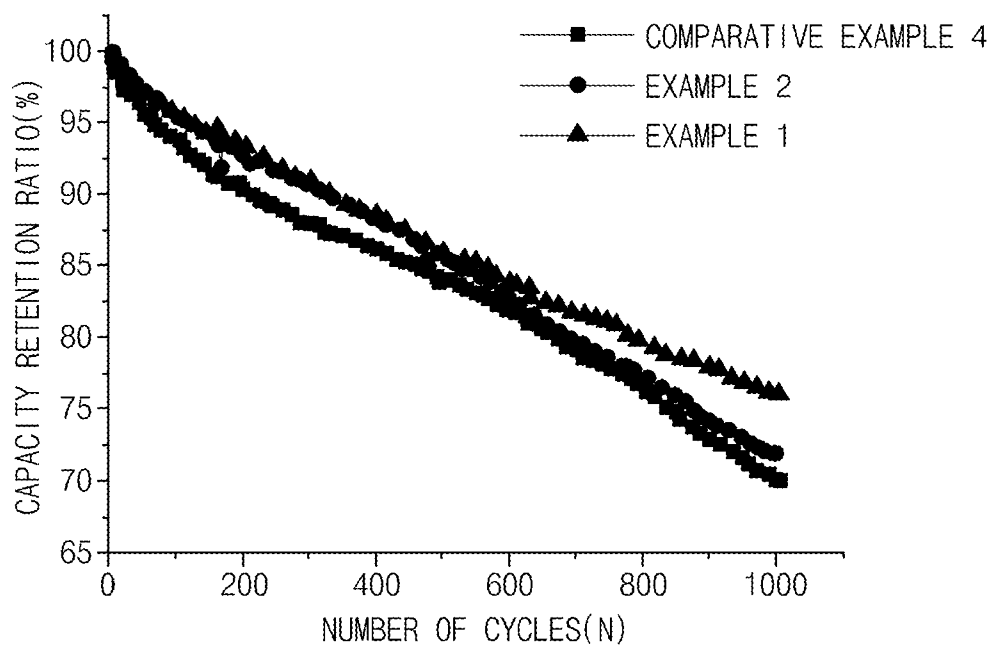
FIG. 7 is a graph illustrating the results of the measurement of capacity characteristics of lithium secondary batteries of Examples 1 and 2 and Comparative Example 4 according to the number of cycles, according to Experimental Example 7.

As illustrated in FIG. 7, the lithium secondary battery of Example 1 according to the present invention exhibited a capacity retention ratio similar to that of Comparative Example 4 up to about 70 cycles. However, a significant difference of about 7% or more in the capacity retention ratio may be obtained from about 70 cycles to 1,000 cycles.

The lithium secondary battery of Example 2 exhibited a significant difference in the capacity retention ratio from the lithium secondary battery of Comparative Example 4 up to about 600 cycles. It may be confirmed that a slope of a graph of the lithium secondary battery of Comparative Example 4 was significantly decreased as the number of cycles increased. Also, it may be understood that the lithium secondary battery of Example 2 exhibited a difference of about 3% to 5% in the capacity retention ratio from the lithium secondary battery of Comparative Example 4 from 900 cycles to 1,000 cycles.

Therefore, it may be confirmed that the high-temperature (55° C.) cycle characteristics of the lithium secondary, in a case where the molar ratio of $LiPF_6$ to LiFSI was in a range of 1:6 to 1:9, were significantly better than the case in which the molar ratio was outside the above range.

Experimental Example 8

Capacity Characteristics After High-Temperature Storage (60° C.) Test According to Molar Ratio of $LiPF_6$ to LiFSI In order to investigate capacity characteristics after high-temperature (60° C.) storage according to the molar ratio of $LiPF_6$ to LiFSI, the lithium secondary batteries of Examples 1 and 2 and Comparative Example 4 were stored at 60° C. for 14 weeks and then charged at 1 C to 4.2 V/38 mA under a CC/CV condition. Then, the lithium secondary batteries were discharged at a CC of 1 C to a voltage of 3.0 V to measure discharge capacities. The results thereof are presented in FIG. 8.

Figure 8:
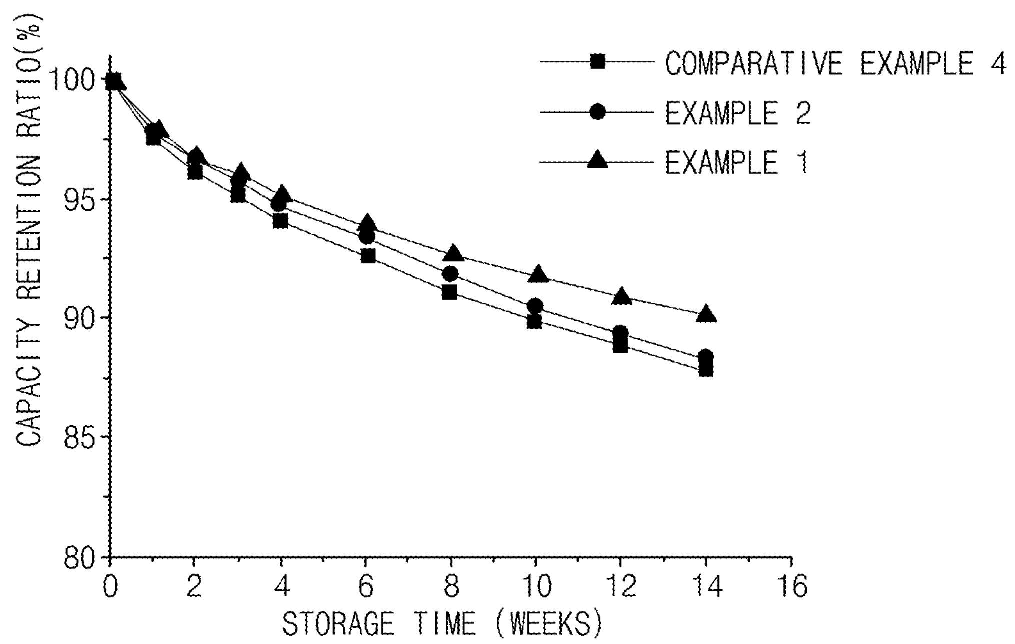
FIG. 8 is a graph illustrating the results of the measurement of capacity characteristics of lithium secondary batteries of Examples 1 and 2 and Comparative Example 4 according to storage time after high-temperature storage, according to Experimental Example 8.

Referring to FIG. 8, there was no difference between capacity characteristics of the lithium secondary batteries of Examples 1 and 2 and capacity characteristics of the lithium secondary battery of Comparative Example 4 up to the storage time of 1 week. However, after the storage time of 2 weeks, it may be understood that the difference between the capacity characteristics of Examples 1 and 2 was increased in comparison to Comparative Example 4.

Specifically, a slope of a graph of the lithium secondary battery of Example 1 was slow up to the storage time of 14 weeks. As a result, the lithium secondary battery of Example 1 exhibited a difference of about 6% or more in the capacity retention ratio from the lithium secondary battery of Comparative Example 4 at the storage time of 14 weeks.

It may be confirmed that a slope of a graph of the lithium secondary battery of Comparative Example 4 was significantly decreased after the storage time of 2 weeks and the capacity characteristics were gradually decreased as the storage time increased.

Therefore, the high-temperature storage characteristics of the lithium secondary battery may be improved by adjusting the molar ratio of $LiPF_6$ to LiFSI. In particular, it may be confirmed that the high-temperature storage characteristics of the lithium secondary, in the case where the molar ratio of $LiPF_6$ to LiFSI was in a range of 1:6 to 1:9, were significantly better than the case in which the molar ratio was outside the above range.

INDUSTRIAL APPLICABILITY

When a non-aqueous electrolyte solution according to an embodiment of the present invention is used in a lithium secondary battery, a robust SEI may be formed on an anode during initial charge of the lithium secondary battery, and thus, the non-aqueous electrolyte solution may improve high-temperature cycle characteristics, output characteristics after high-temperature storage, capacity characteristics, and swelling characteristics as well as low-temperature output characteristics. Therefore, the non-aqueous electrolyte solution may be suitable for lithium secondary batteries.

The invention claimed is:

1. A non-aqueous electrolyte solution comprising:

i) a non-aqueous organic solvent consisting of a carbonate-based solvent;

ii) lithium bis(fluorosulfonyl)imide (LiFSI); and iii) an additive comprising a vinylene carbonate-based compound and a sultone-based compound;

wherein the carbonate-based solvent comprises propylene carbonate and at least one selected from the group consisting of butylene carbonate (BC), dimethyl carbonate (DMC), diethyl carbonate (DEC), dipropyl carbonate (DPC), ethylmethyl carbonate (EMC), methylpropyl carbonate (MPC), ethylpropyl carbonate (EPC), and a mixture of two or more thereof, wherein the carbonate-based solvent does not comprise ethylene carbonate (EC), wherein a concentration of the lithium bis(fluorosulfonyl)imide in the non-aqueous electrolyte solution is in a range of 0.6 mol/l to 1.5 mole/l, and wherein an amount of the propylene carbonate is in a range of 5 parts by weight to 60 parts by weight based on 100 parts by weight of the non-aqueous organic solvent.

2. The non-aqueous electrolyte solution of claim 1, wherein the non-aqueous electrolyte solution further comprises a lithium salt, wherein a mixture ratio of the lithium salt to the lithium bis(fluorosulfonyl)imide is in a range of 1:6 to 1:9 as a molar ratio.

3. The non-aqueous electrolyte solution of claim 2, wherein the lithium salt comprises any one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and a mixture of two or more thereof.

4. The non-aqueous electrolyte solution of claim 1, wherein the amount of the propylene carbonate is in a range of 10 parts by weight to 50 parts by weight based on 100 parts by weight of the non-aqueous organic solvent.

5. The non-aqueous electrolyte solution of claim 1, wherein the vinylene carbonate-based compound comprises vinylene carbonate, vinylene ethylene carbonate, or a mixture thereof.

6. The non-aqueous electrolyte solution of claim 1, wherein the sultone-based compound comprises any one selected from the group consisting of 1,3-propane sultone, 1,4-butane sultone, a1,3-propene sultone, and a mixture of two or more thereof.

7. A lithium secondary battery comprising:

a cathode including a cathode active material;

an anode including an anode active material;

a separator disposed between the cathode and the anode; and the non-aqueous electrolyte solution of claim 1.

8. The lithium secondary battery of claim 7, wherein the anode active material comprises a carbon-based anode active material.

9. The lithium secondary battery of claim 8, wherein the anode active material comprises graphitic carbon.

* * * * *